No. 780,397. PATENTED JAN. 17, 1905.
F. WHITNEY.
LOCATION ATTACHMENT FOR TRANSITS, &c.
APPLICATION FILED APR. 9, 1904.

WITNESSES:
C. N. Walker
P. W. Birkhead.

INVENTOR
Frederic Whitney
BY Howson & Howson
Attorneys.

No. 780,397. Patented January 17, 1905.

UNITED STATES PATENT OFFICE.

FREDERIC WHITNEY, OF DAWSON, TERRITORY OF NEW MEXICO.

LOCATION ATTACHMENT FOR TRANSITS, &c.

SPECIFICATION forming part of Letters Patent No. 780,397, dated January 17, 1905.

Application filed April 9, 1904. Serial No. 202,412.

*To all whom it may concern:*

Be it known that I, FREDERIC WHITNEY, a citizen of the United States, and a resident of Dawson, county of Colfax, Territory of New Mexico, have invented certain new and useful Improvements in Location Attachments for Transits, &c., of which the following is a specification.

My invention relates to surveyors' transits, levels, and other like instruments, and more especially to an attachment adapted to facilitate the location of such an instrument so as to cause the axis of the stem to aline vertically with the hub or point over which the instrument is set for use.

Heretofore it has been the common practice to use a plumb-bob suspended by a cord from the center of the stem; and it is the object of my invention to dispense with the use of this plumb-bob by the employment of a device which will not only be susceptible of more accurate adjustment of the instrument with reference to the transit hub or point, on the ground or base over which the instrument is set, but will likewise be capable of effecting such adjustment in less time, and, furthermore, will not cost any more than the plumb-bob, while being applicable to any standard transit in use.

With these objects in view my invention consists of the novel construction of adjusting device hereinafter described with reference to the accompanying drawings and more particularly pointed out in the claims.

Figure 1:
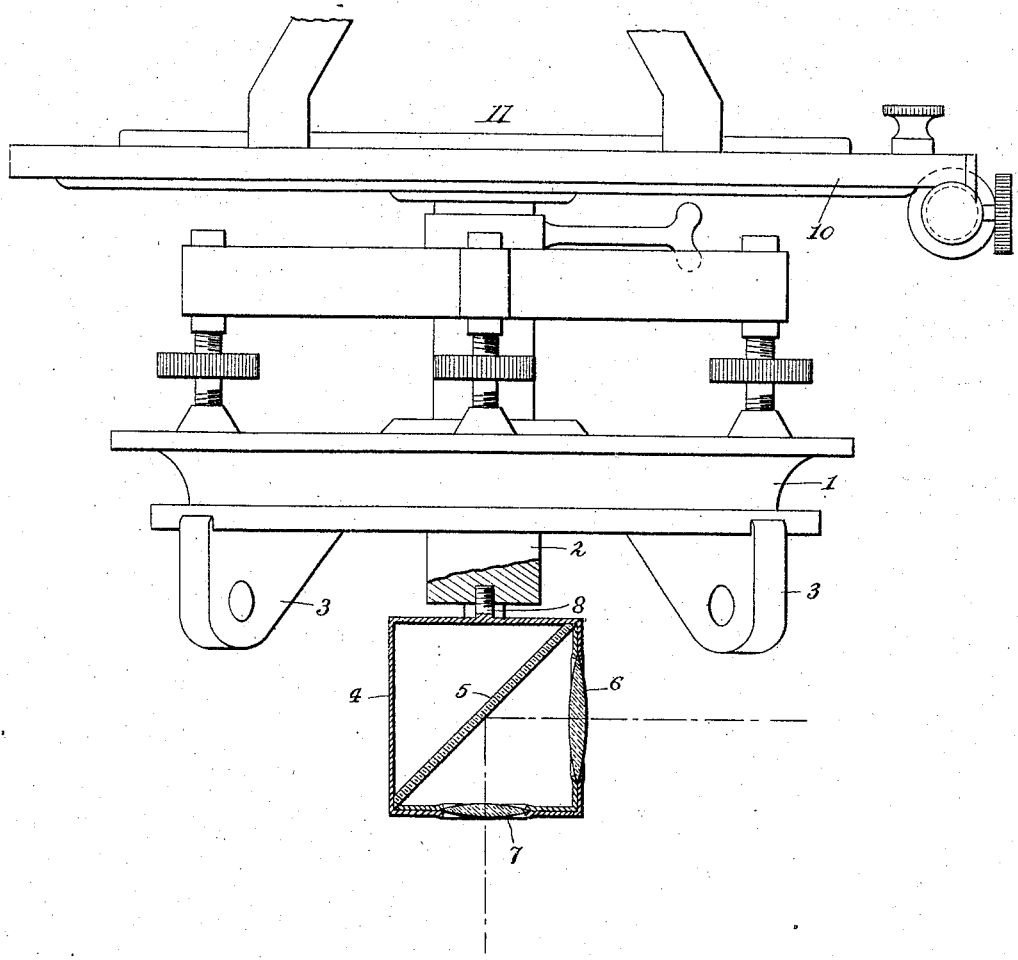
Figure 2:
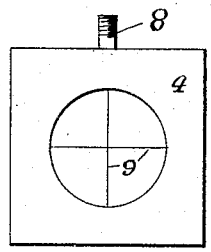

In the drawings, Figure 1 is a side elevation of so much of a transit as is necessary to illustrate the application of my invention thereto, the latter being shown in central vertical section; and Fig. 2 is a front view of my invention detached from the transit.

While I have shown my device as applied to a transit and will so describe it for convenience, it will be understood that its use is not restricted to transits only, as it may be applied to other surveying instruments which must be set up for use over a given point, so that the latter may be brought into alinement with the vertical axis of the stem of the instrument.

The supporting-table 10 of the transit is journaled, as usual, upon the base 11, fixed to the transit-stem 2, mounted in the tripod-plate 1, the latter of which is supported by tripod-legs (not shown) hinged to brackets 3. The plumb-bob is usually hung from a cord attached to the center of the stem 2 below the plate 1, and when the instrument is set up over a given transit point or hub the legs of the tripod are adjusted until the plumb-bob is directly over the transit-point. This adjustment takes considerable time and at best is subject to inaccuracies, which my device avoids. I provide two lenses 6 and 7 at right angles to each other and a reflecting surface or mirror at an inclination of forty-five degrees to each of said lenses and to the axis of the stem, all supported in apertures in a suitable casing 4, attached to the lower end of the stem 2. The axis of the lens 7 coincides with the axis of the stem 2, and the axis of the lens 6 is at right angles thereto. The object-lens enlarges the field of the mirror, while the reflected image appears to be seen on the eye glass or lens. The casing 4 is of brass or other suitable material and is provided with a screw-threaded nipple or post 8, the axis of which is in line with the axis of the object glass or lens 7 and with the axis of the stem 2 when the said nipple or post is screwed into the screw-threaded socket in the lower end of the stem 2, also in axial alinement with said stem. The eye glass or lens 6 is provided with cross-lines 9, preferably ground into the outer surface of the lens, the center of the cross being at the center of the lens.

In adjusting the instrument by my device it is set up and leveled with the stem approximately over the transit-point, as usual, and the operator looks at the lens 6, and if he observes the image of the transit-point reflected by the mirror 5 coinciding with the center of the cross on the eye piece or lens 6 he knows that the instrument is properly set directly over the said transit-point. If the image does not coincide with such center, he then moves by the usual adjustment the instrument in the direction indicated by the postion of the image with respect to the cross and as much as necessary to bring the center of the lens 7 directly over the fixed or transit point, thereby bringing the image reflected from the mirror into coincidence with the center of the cross on the lens 6, an operation that can be quickly effected and which will result in an accurate adjustment of the instrument, so that the axis of the stem shall be in vertical alinement with the point.

While I have shown and described the reflectors as inclined to the axis of the stem at an angle of forty-five degrees, it is obvious that it may be arranged at different angles thereto, the essential requirement being that the axis of the eye glass or lens shall be arranged at the same angle with respect to the reflectors or mirrors, so that the axis of said lens shall intersect the reflecting-surface at the same angle as the angle of incidence and reflection of a ray reflected from the fixed point to the mirror when the instrument is centered over said point.

I claim as my invention—

1. As a new article of manufacture, a device for locating or centering a transit, or like instrument, over a fixed point, comprising a casing, means for attaching said casing to the stem of the instrument, a reflector mounted therein so that it will be inclined to the axis of the stem when the device is attached thereto, said casing having apertures in adjacent walls in front of the reflector, and an eye glass or lens in one of said apertures inclined to the mirror at the same angle as the latter to the axis of the stem when the device is attached to the same, substantially as described.

2. As a new article of manufacture, a device for locating or centering a transit, or like instrument, over a fixed point, comprising a casing, means for attaching said casing to the stem of the instrument, a reflector mounted therein so that it will be inclined to the axis of the stem when the device is attached thereto, said casing having apertures in adjacent walls in front of the reflector, an eye glass or lens in one of said apertures inclined to the mirror at the same angle as the latter to the axis of the stem when the device is attached to the same, and an object glass or lens in the other aperture at right angles to the said axis of the stem, substantially as described.

3. As a new article of manufacture, a device for locating a transit or other surveying instrument over a transit point or hub comprising a casing, a mirror mounted therein, and two lenses mounted in adjacent sides of the casing and having their axis at forty-five degrees to the surface of the mirror, and a screw-threaded nipple on the casing adapted for engagement with a socket in the center of the stem of the instrument, substantially as described.

In testimony whereof I have signed my name to this specification in the presence of two subscribing witnesses.

FREDERIC WHITNEY.

Witnesses:
G. A. WHITNEY,
J. B. DAWSON.